United States Patent
Anand et al.

(10) Patent No.: US 7,461,223 B2
(45) Date of Patent: Dec. 2, 2008

(54) RETAINING SHADOW COPY DATA DURING REPLICATION

(75) Inventors: Karandeep Singh Anand, Kirkland, WA (US); Manoj Valiyaparambil, Hyderabad (IN); Abid Ali, Hyderabad (IN); Arasu Shankher, Hyderabad (IN); Vijay Sen, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 197 days.

(21) Appl. No.: 11/458,552

(22) Filed: Jul. 19, 2006

(65) Prior Publication Data

US 2007/0277010 A1    Nov. 29, 2007

(51) Int. Cl.
*G06F 12/00* (2006.01)
(52) U.S. Cl. ..................................... 711/162
(58) Field of Classification Search ................ 711/162; 714/6, 7; 707/204
See application file for complete search history.

(56) References Cited

U.S. PATENT DOCUMENTS

| | | | |
|---|---|---|---|
| 4,459,658 A * | 7/1984 | Hecht | |
| 5,664,186 A * | 9/1997 | Bennett et al. | |
| 5,870,537 A * | 2/1999 | Kern et al. | |
| 6,088,694 A * | 7/2000 | Burns et al. | 707/8 |
| 6,145,049 A * | 11/2000 | Wong | |
| 6,473,775 B1 | 10/2002 | Kusters et al. | |
| 6,934,822 B2 | 8/2005 | Armangau et al. | |
| 6,959,313 B2 | 10/2005 | Kapoor et al. | |
| 7,100,072 B2 * | 8/2006 | Galipeau et al. | 714/6 |
| 2002/0049718 A1 | 4/2002 | Kleinman et al. | |
| 2004/0254936 A1 | 12/2004 | Mohamed | |
| 2004/0267836 A1 | 12/2004 | Armangau et al. | |
| 2005/0125411 A1 | 6/2005 | Kilian et al. | |
| 2005/0216788 A1 | 9/2005 | Mani-Meitav et al. | |
| 2006/0224642 A1 * | 10/2006 | Chandhok et al. | 707/204 |

OTHER PUBLICATIONS

HP ProLiant Data Protection Storage Server, Powered by Microsoft System Center Data Protection Manager 2006, 2 pages; http://h18006.www1.hp.com/storage/dpss.html; Accessed on May 4, 2006 (PDF Attachment).

NetBackup Enterprise Server, 2006, 3 pages; http://www.veritas.comProducts/www?c=keymessage&refId=2&psId=3; Accessed on May 4, 2006 (PDF Attachment).

(Continued)

*Primary Examiner*—Hiep T Nguyen
(74) *Attorney, Agent, or Firm*—Workman Nydegger

(57) ABSTRACT

Implementations of the present invention provide systems, methods, and components configured to preserve valid shadow copies during replication cycles, before those valid shadow copies have expired. In particular, one or more components can identify the size and rate of changes in production server data that will be applied to a new volume shadow copy. The components can then determine the storage area that would be needed to store the new volume shadow copy in the backup volume and apply changes onto the backup volume if there is appropriate space. If there is not an appropriate amount of space, the components can alert the system that new action should be taken to preserve both prior, valid shadow copies as well as new shadow copies. For example, a backup administrator may need to increase the shadow copy storage space, or assign a new storage medium for handling new shadow copies.

20 Claims, 3 Drawing Sheets

OTHER PUBLICATIONS

Rapid Recovery with the Volume Shadow Copy Service, Microsoft TechNet, 2006, 9 pages; http://www.microsoft.com/technet/technetmag/issues/2006/01/RapidRecovery/default.aspx; Accessed on May 4, 2006 (PDF Attachment).

IBM Tivoli Storgae Manager for Data Retention for z/OS, 1 page http://publib.boulder.ibm.com/infocenter/tivihelp/v1r1/index.jsp?topic=/coml.ibm.itsmfdtzos.doc/dataretention_zOS. html; Accessed on May 4, 2006 (PDF Attatchment).

* cited by examiner

RETAINING SHADOW COPY DATA DURING REPLICATION

CROSS-REFERENCE TO RELATED APPLICATIONS

The present application claims the benefit of priority to Indian Patent Application Ser. No. 1285/DEL/2006, filed in the Indian Patent Office on May 29, 2006, and entitled "Retaining Shadow Copy Data During Replication," the entire contents of which are incorporated herein by reference. The aforementioned Indian patent filing was made pursuant to USPTO Foreign Filing License No. 536,417, granted on May 23, 2006.

BACKGROUND

Background and Relevant Art

In general, computer systems and related devices are commonly used for a variety of reasons, such as in the general case of creating a word processing document in a work setting, as well as creating a file used for more sophisticated database purposes. As computerized systems have increased in popularity for such uses, the various hardware and software capacities associated therewith have also increased. For example, the various data processing (e.g., file, mail, database, etc.) tasks that conventional computer systems made feasible only a few years ago are now often made even more feasible by ever faster and smaller, multi-tasked computer systems. As a result, computer systems are quite proliferate in any given organization, and the tasks requested of each computer system have also increased. Not surprisingly, the costs associated with running and managing any given computer system or set of computer systems has also increased.

Due in part to the improvements in processing capabilities for any given computer system coupled with the continually increasing costs of such capabilities, organizations often see a number of benefits in sharing or distributing resources (e.g., hardware and/or software-based resources). In particular, organizations commonly organize computer systems so that several work stations share the processing and storage resources of a single node (e.g., a processing and/or storage node). For example, an organization might partition a single physical at one server node into several different volumes that might in turn be accessible as several individual drives over a network. These partitioned drives could then be further allocated among users and/or workstations so that, for example, only one set of personal workstations can access one set of the partitioned drives, while another, different set of personal workstations might be able to access only a different set of the partitioned drives.

Along these lines, organizations can now partition a single server node to host multiple "virtual machines." In short, a virtual machine is a unique installation of an operating system on its own partition of drive space on a given host computer system. The virtual machine can be configured to appear for all intents and purposes as a separate work station, even though it is only a partition of the host computer system's physical resources. For example, the virtual machine can be addressable over a network with a network address that is different from the host computer's. Furthermore, the virtual machine can itself host a number of different drive partitions within the allocation made for the virtual machine on the host's physical disk. These drive paths managed by the virtual machine can be named the same as those managed by the host computer system, since they are managed by effectively different entities.

At least one advantage of virtual machines, therefore, is that they can be used to provide a number of different computational functions without necessarily requiring the added cost of purchasing additional computer hardware. For example, an organization might deploy different host servers in different network locations, and, within each host server, further deploy tens and/or hundreds of virtual machines. Some virtual machines could be used as mail or database servers, while other virtual machines could be used as personal workstation computers that are accessed by a network client as though the personal workstation were located locally. Still other virtual machines could be used for testing purposes, such that the virtual machines can be easily deleted from the host server when they are no longer needed.

As the use of virtual machines becomes more popular in organizations, there arises additional needs to ensure that virtual machines are properly managed. For example, conventional server administrator topologies include such things as a group of system (e.g., server, work station, and/or network) administrators that configure accounts, administer passwords, and organize physical and software resources in an organization. With large enterprises, there may even be a large number of system administrators each tasked with different responsibilities.

For example, one system administrator might be tasked with providing and setting up work stations in end-user offices, while another system administrator is tasked with providing the end-user with a particular login account, and while still another system administer might be tasked with providing and monitoring physical connections (e.g., network connections, power connections) to each computer system. Each such system administrator could then be required to report to an overall managing system administrator for a particular geographic location. Depending on the size of the organization, the managing system administrator could also be required to report to still another system administrator higher up a management hierarchy, and so on.

With conventional systems, it is generally possible for one or few system administrators to manage several tens of servers and personal workstations. Management of potentially hundreds and/or thousands of machines, however, such as in the case of implementing a large number of virtual machines, is much more complex. Specifically, one or few system administrators may be unable to manage the complexities of thousands of virtual machines, even if those virtual machines are hosted on a relatively small number of host servers. In particular, a system administrator responsible for managing password requests for one hundred or so user accounts may be unable to effectively manage the same for one thousand computers. Similarly, a system administrator responsible for ensuring sufficient physical and network resources for each of one hundred or so physical computer systems may be overwhelmed with trying to ensure potentially thousands of virtual machines are provisioned with enough hardware and software resources to perform as intended, particularly without disrupting service to other machines in the organization.

Of course, simply hiring additional system administrators to handle the extra burden(s) can present significant cost concerns that the organization may be attempting to avoid by using virtual machines in the first place. Accordingly, there are a number of difficulties that can be addressed with respect to the effective operation and administration of virtual machines in an organization.

BRIEF SUMMARY

Implementations of the present invention solve one or more problems in the art with systems, methods, and computer program products configured to ensure that shadow copies are preserved in a backup volume for as long as the shadow copies remain valid as per the administrator's backup goals/intents. In particular, implementations of the present invention provide for the automatic determination of shadow copy storage space on a backup volume based on determinations of write rates at the production server. Such a determination of available space can then be used in some cases to further determine whether the newer shadow copies can be created or not, in order to retain the existing shadow copies. In one implementation, the shadow copy storage space in the backup volume can be automatically reapportioned each replication cycle to accommodate anticipated write rates on the production server. Furthermore, the shadow copy storage space can be effectively locked so that shadow copies that exceed the present shadow copy storage space can be dealt with in an appropriate manner, and thus avoid overwriting prior, but still valid, shadow copies.

For example, a method of correlating determinations of data changes at a production server with available shadow copy storage space in one or more backup volumes can involve determining the size of changes at a production server. Such a method can generally involve identifying a set of one or more data changes at a production server, as well as determining a total size of changes in the set that are to be applied to a shadow copy storage volume, such that the total size of changes are overestimated. In addition, the method can involve identifying a size of available shadow copy storage space in the shadow copy storage volume, and a step for applying the set of one or more data changes to the identified available shadow copy storage space. Ultimately, the file changes can be applied in such a way, therefore, that valid shadow copies remain in the shadow copy storage volume prior to expiration.

An alternative method can be based more on determining available shadow copy storage space in one or more backup volumes as a replica agent attempts to apply the received changes. Such a method can include receiving one or more data changes from a production server, and assigning a standard value to each of the one or more data changes as they are applied. The method can also involve calculating an amount of available shadow copy storage space in a backup volume, such that the amount is underestimated in order to preserve valid shadow copies stored in the backup volume. In addition, the method can involve identifying that the standard value of the initial set of the one or more data changes is less than the calculated amount of the available shadow copy storage space in the backup volume. If appropriate, the one or more data changes can then be applied to the backup volume. As such, the valid shadow copies in this method can also remain in the shadow copy storage volume prior to expiration.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
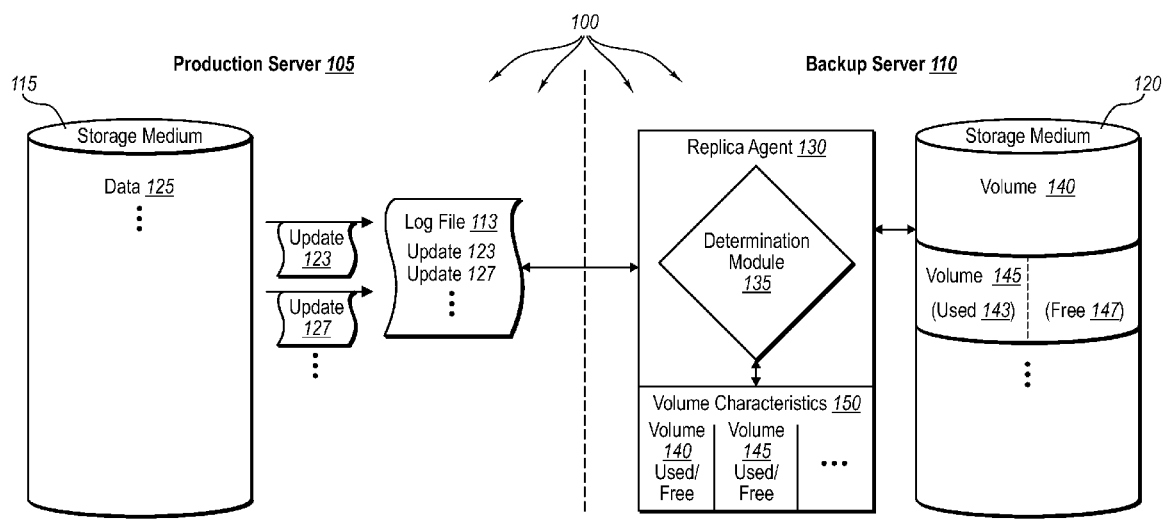
FIG. 1 illustrates an overview schematic diagram of a production server and backup server in a backup system, wherein a replica agent receives updates from a production server and applies the updates to a backup volume, in accordance with an implementation of the present invention.

The present invention extends to systems, methods, and computer program products configured to ensure that shadow copies are preserved in a backup volume for as long as the shadow copies remain valid as per the administrator's backup goals/intents. In particular, implementations of the present invention provide for the automatic determination of shadow copy storage space on a backup volume based on determinations of write rates at the production server. Such a determination of available space can then be used in some cases to further determine whether the newer shadow copies can be created or not, in order to retain the existing shadow copies. In one implementation, the shadow copy storage space in the backup volume can be automatically reapportioned each replication cycle to accommodate anticipated write rates on the production server. Furthermore, the shadow copy storage space can be effectively locked so that shadow copies that exceed the present shadow copy storage space can be dealt with in an appropriate manner, and thus avoid overwriting prior, but still valid, shadow copies.

As will be appreciated more fully from the following description and claims, implementations of the present invention can prevent loss of valid shadow copy data. Generally, the "validity" of shadow copy, as used herein, relates to a backup intent for backup system 100, where a backup administrator's creates certain settings (i.e., the intent) for keeping incremental data updates available on a backup server for a specified time. In particular, a "valid" shadow copy is essentially a shadow copy that has not yet "expired," as defined by a particular "backup intent." For example, if a backup administrator set a backup intent that indicates that shadow copies are to be amassed x number of times a day, and then stored for at least 14 days before being deleted or perhaps moved to an archive media, the "valid" shadow copies are at least those that are not older than 14 days. By contrast, shadow copies at the backup server that are older than 14 days would be considered "invalid," or "expired," can be deleted or moved to an archive media, as desired by the backup administrator.

As such, implementations of the present invention are generally configured to prevent valid shadow copy data loss that might otherwise occur due to insufficient shadow copy storage space, and/or due to loss in shadow copy storage space (also referred to as the "diff area") resulting from an increase in storage area for the main data being protected. For example, one or more components in one implementation can be configured to track growth of the data to be protected at a production server, and to further track the used and free space for a backup volume configured to hold shadow copy data. When, at any time, the components determine that valid shadow copy data in the backup volume are in danger of being overwritten, the components can halt replication processes at least momentarily (e.g., no new shadow copies are created). The components can then make automatic adjustments to the shadow copy storage space, or request direction of the same from a backup administrator before continuing.

As a preliminary matter, implementations of the present invention are described primarily herein where the storage area for the main data to be protected and the storage area for the shadow copy data are on separate volumes. Such an architectural schematic, however, is not required. In particular, implementations of the present invention can also be applied to the situation in which the same backup volume contains allocated storage areas for main data and for the corresponding updates (i.e., shadow copy data).

For example, FIG. 1 illustrates an architectural overview of backup system 100, which includes a production server 105 (e.g., a mail, file, or database server, etc.) that communicates with a backup server 110 (e.g., a data protection manager—"DPM"—server). As shown, production server 105 includes at least storage medium 115, which further includes one or more volumes of data to be protected, such as data 125. A log file 113 at production server 105 can identify all changes to data 125. Accordingly, log file 135 includes updates 123 and 127, which production server 105 will ultimately pass to backup server 110.

FIG. 1 also illustrates that backup server 110 comprises replica agent 130. Generally, replica agent 130 comprises one or more sets of computer-executable instructions configured to communicate with production server 105, and to track various characteristics of one or more attached backup storage mediums, such as storage medium 120. For example, FIG. 1 shows that replica agent 130 can include a volume characteristics 150 component, which stores various used and free space characteristics for each volume in storage medium 120 (and/or any other connected backup medium).

By way of explanation, replica agent 130 and/or determination module 135 need not necessarily be a component resident on backup server 110. In particular, replica agent 130 and/or determination module 135 can be implemented on production server 105 and/or on any other server (not shown) in backup system 100. The present illustration(s) herein of replica agent 130 and determination module 135 on backup server 110, therefore, are primarily for purposes of convenience in illustrating at least one implementation.

In any event, determination module 135 can identify the size of updates made to protected data (e.g., 125) at production server 105. In one implementation, determination module 135 determines the actual byte size of all changes in data 125 over the course of a replication cycle (e.g., every 15 minutes) during a general archive period (e.g., 14 days—the time to keep shadow copies before archiving or deleting them). Such a granular determination may not necessarily be required in all cases, however. For example, it may be more efficient in some cases to identify a more conservative estimate of how much space may be needed to copy over data updates into a diff area (e.g., 143). In one implementation, this can be done by identifying byte changes in terms of file (or byte) blocks.

In general, a file block (or byte block) is typically a set of bytes in a "file." For purposes of this specification and claims, a "file" will be understood in its broadest sense to include any type of discrete data collection, such as discrete data collections associated with electronic mail, database programs, system libraries or components, etc., rather than (or in addition to) ordinary user application files. In any event, the set of bytes in a file block typically has a fixed size of typically from about 4096 bytes to about 16384 bytes. Thus, a file could be described as a set of 3 byte blocks in addition to being described as some arbitrary number of bytes. As will be understood more fully from the following specification and claims, therefore, replica agent 130 (via determination module 135) can determine the number of blocks that need to be written from production server 105 (i.e., size of changes), the number of available blocks in storage medium 120 (i.e., size of allocated storage), or some combination thereof.

For example, replica agent 130 (via determination module 135) can determine the total size of changes to data 125 by tracking changes during a replication process but before synchronizing this data with (i.e., applying these changes to) the corresponding backup volume. This can be done in one instance by determining all created, modified, and/or deleted files from a file system log/journal (e.g., an update sequence number journal, block change bitmap, or log file) 113. Replica agent 130 can then ascribe a certain standard value (i.e., block value) with regard to whether metadata in a file has changed, whether the file is new, whether the file has been appended, whether one or more bytes in a given file block have changed, and/or whether the file has been deleted. As previously mentioned, this block value can then provide a conservative overestimate of how much will ultimately need to be written at storage medium 120.

For example, replica agent 130 can be configured to tally a certain number of blocks for each metadata change, and count this separately from block values assigned to other types of file changes. In one implementation, replica agent 130 counts 1 block each time it identifies a change in the file metadata related to time of file modification, security properties, file name, or some other file attribute. If each of these and other metadata properties have changed, replica agent 130 may need to count several separate blocks. The replica agent 130 can, however, be optimized to simply identify 1 block for metadata changes that could cancel each other out, such as identifying several changes to the same metadata field (e.g., several file name changes).

Replica agent 130 can also be configured to count all of the new blocks that are added to a file. For example, if log file 113 identifies a newly created file having 3 blocks, replica agent 130 can add 3 blocks to the tally. Alternatively, for appended files, replica agent 130 might only add one block value for each block that has been added to the given file. Similarly, replica agent 130 can be configured to add a single block for one or more byte changes within the same file block, or add multiple blocks when several bytes across several different blocks in the same file have been changed. Replica agent 130 can then add together each of these individual tallies (i.e., number of metadata changes, number of file changes, creations, or appends) to gain an estimate for how much space will be required at storage medium 120.

In some cases, this tally can also be modified by consideration of the total number of deleted blocks. For example, some volume shadow copy services are configured to copy a prior version of a block from a backup volume (e.g., 140) to a shadow copy volume (e.g., 143) when identifying that the production server has deleted that block at its storage medium (e.g., 115). In some cases, the volume shadow copy service may be configured only to report a deletion in a block when the given deleted block has been overwritten by another file or file block. In other cases, the volume shadow copy service may be configured to report both generic byte/block deletions as well as byte/block overwrites. Accordingly, replica agent 130 can be configured to accommodate whatever shadow copy services that are employed to ensure that the most accurate total is reflected of blocks that will need to be passed to the corresponding backup volume.

For example, replica agent 130 can be configured to identify from a file system journal, log file or block change bitmap (e.g., 113) only the total number of deleted blocks that are being overwritten, as well as the size of those deleted files. In one implementation, the size of those deleted blocks may be based on a cumulative value across multiple replication cycles (and changes due to error correction). Along these lines, replica agent 130 can also be configured to assume that all newly added blocks will necessarily overwrite deleted blocks where available. In this example, therefore, replica agent 130 may determine that the total size of changes for data 125 can be approximated by the total of the number of blocks due to metadata changes, the number of newly added blocks, and the number of deleted blocks that were overwritten by newly added blocks.

Upon (or before) identifying the size of changes at production server 105, replica agent 130 can also determine the size of available area at the backup storage medium (e.g., 120) to identify whether to apply the identified changes. For example, replica agent 130 can identify the amount of free space in the storage area allocated for shadow copies in main backup volume 140 by querying a volume shadow copy service (not shown). Alternatively, where the main data backup and shadow copy backups are stored on separate volumes (e.g., 140, 125), replica agent 130 identifies how much free space (e.g., 147) is found in the volume used to storage shadow copies. In either case, replica agent 130 determines whether the changes at production server 105 can be applied to storage medium 120 without overwriting existing, valid shadow copies.

In particular, if replica agent 130 identifies that the total size of file/data changes (e.g., 123, 127) from production server 105 does not exceed the available free space (e.g., 147) available for shadow copies, then replica agent 130 can simply apply these changes to storage medium 120 as appropriate. On the other hand, if the size of changes (e.g., 123, 127) on the data to be protected exceeds the calculated space available for shadow copies, replica agent 130 can at least momentarily halt applying changes to storage medium 120. Replica agent 130 can also raise an alert through an appropriate interface, to indicate to a backup administrator (or appropriate system component) indicating that replication has halted, and that the storage area allocated for shadow copies is completely full.

In other cases, replica agent 130 can indicate that the storage area allocated for shadow copies is not full, but nevertheless insufficient in size to accommodate current changes. Alternatively, replica agent 130 can be configured to determine a rate of change identified from production server 105, and thus raise an error indicating that the available space allocated for shadow copies is likely to be insufficient in size. Replica agent 130 can also prompt the backup administrator to increase the available space for writing shadow copies (e.g., by increasing an allocated portion within main data backup volume 140, or by increasing the total size of volume 145). Replica agent 130 can further recommend that the backup administrator simply delete existing shadow copies on a "first in first out" order until there is sufficient size. For example, in one implementation, replica agent 130 recommends how many shadow copies to delete, and reports to the backup administrator a last recovery point that will be available after performing any such deletions.

When appropriate, replica agent 130 can then restart or resume the replication cycle in accordance with the original schedule, and apply changes indicated by production server 105. As the replication cycle continues, replica agent 130 can continue to estimate the available free space in the shadow copy storage space. For example, when replica agent 130 sets up protection initially, replica agent 130 can identify the used and free space, and store this information in a volume characteristics component 150. In such a case, replica agent 130 might set the used space (e.g., 143) in the shadow copy storage space (e.g., 145) to 0, and store the upper end value of the shadow copy storage space/volume (or of the allocated portion in the main data backup volume 140) 145 previously set by the backup administrator. During replication, or any other operation that modifies the used space in the volume (e.g., validation and error correction), replica agent 130 can continually add the number of blocks to the used space amount, which conversely subtracts these amounts from the previously identified free space.

Thus, replica agent 130 can continually estimate how much space may be left in the backup volume with what has been written. Nevertheless, replica agent 130 may need to further adjust this total further before applying the remainder of changes. As appropriate (whether before or during a replication cycle), replica agent 130 can also delete expired shadow copies from the used space (e.g., 143) and subtract the size of each deleted shadow copy from the used space (e.g., 143), as appropriate. Replica agent 130 can also consider any modifications to the upper end of the allocated shadow copy storage space (or storage volume—e.g., 145). For example, replica agent 130 can receive additional input from a backup administrator regarding an increase or decrease in the total size allocated for shadow copies. Thus, when appropriate, replica agent 130 can continue to pass any remaining files or file blocks to the available shadow copy storage space.

One will appreciate that, due to the starting and stopping of replication, there may be instances of inconsistency between the main data backup (e.g., 140) and any shadow copy backups (e.g., 145) compared to what is being written at production server 105 into log file 113. Accordingly, replica agent 130 can also be configured to perform (or recommend) synchronization with a consistency check (i.e., validation and error correction) to accommodate any overflow in log file 113. Such synchronization is discussed more fully hereinafter.

Continuing with reference to FIG. 1, rather than necessarily calculating the total size of changes and applying those changes when appropriate, replica agent 130 can be configured to make ongoing queries and determinations of what space is available, and then apply portions of the received updates to the shadow copy storage area. In contrast with the foregoing description, this can place the bulk of work into identifying the size of free available space at storage medium 120 for writing shadow copies, rather than on identifying the size of all changes being received from production server 105.

Generally, there are a number of mechanisms in accordance with implementations of the present invention in which this can be done.

In one implementation, for example, when receiving file changes from production server 105 during a replication cycle, replica agent 130 can simply query the available free shadow copy storage space (e.g., 145) on a per-file or per-block basis, and then, if appropriate, write each next file (or block(s)) to the available shadow copy storage space. If there is insufficient space for the next set of one or more files (or block(s)), then replica agent 130 can raise an alert. Querying the available free space for each file or file block being passed to the backup volume, however, may be difficult for some backup systems from a resource usage standpoint. Accordingly, replica agent 130 can be configured to use a less granular calculation that nevertheless provides a fairly conservative estimate of what may be available.

For example, replica agent 130 can be configured to calculate a "safe" available area of free space for storing shadow copies, and then query this available area on a much less frequent basis (e.g., every 10,000 files or file blocks) than on a per file or per block basis as described above. As previously mentioned, attempting to set aside a safe underestimated amount can be helpful for preserving valid shadow copies. In addition, another reason such underestimating can be helpful is that some volume shadow copy services may only apply data updates of deleted blocks to the shadow copy storage area when new blocks get written on top of those deleted blocks. Thus, setting a safe underestimated limit can help maintain existing shadow copies where a prior estimation of the available space would otherwise turn out to be insufficient—that is, where more data than expected (i.e., overwritten blocks) would be sent to the shadow copy storage space.

In any event, replica agent 130 can determine the safe shadow copy storage space any number of ways. In one implementation, for example, replica agent 130 can identify at the outset a presently available amount of free space for storing shadow copies, and then set a predetermined percentage of the free space as a "safe." In one implementation, for example, replica agent 130 identifies 90% of the free space as safe. Thus, with an initial set of files or file blocks (e.g., the first 10,000 files or file blocks of 100,000 files or blocks), and knowing a rough approximation of the value of the safe free space (i.e., 90% of an initial determination of free space), replica agent 130 can write each of the files or file blocks of the initial set into the available safe storage space.

After writing the first set of files or file blocks, replica agent 130 can then determine (such as by querying an appropriate volume shadow copy service) the remaining available free space, and again set off "90%" of the free space as safe. If the next set of files or file blocks fit within this space, then replica agent 130 can simply write these blocks into the free space, as before. If, however, replica agent 130 determines that the new value for the free space is less than appropriate for the next set of files or file blocks, replica agent 130 can then perform a number of additional steps.

For example, in one implementation, replica agent 130 simply writes only those files or file blocks of the next set that can fit into the safe available free space. In some cases, replica agent 130 may be configured to write only files, rather than blocks of files, and thereby keep the main data storage (e.g., volume 140) consistent with the shadow copy storage (e.g., volume 145). For example, if two blocks of a file have changed at production server 105, replica agent 130 can be configured to write both of the file blocks to storage medium 120, or neither of the blocks in this file if only one of the blocks will fit.

If replica agent 130 subsequently determines that no single file (i.e., changed or added blocks in the file) can be written to the safe available shadow copy storage space, replica agent 130 can then set the safe available size to an appropriate value (e.g., "0"), which raises an alert. This can cause replica agent 130 to raise an alert indicating that a given write operation could not be completed successfully, and that there are x amount of files or file blocks that still need to be accommodated. Replica agent 130 can then recommend that the backup administrator increase the total allocated storage area for shadow copies (e.g., size of volume 145, or size of an allocation within volume 140) or delete existing shadow copies before trying again to apply changes. Assuming such adjustments can be—and are—made, replica agent 130 can repeat this process of writing sets of files and/or file blocks into the safe available shadow copy storage space, as described.

Along these lines, replica agent 130 can also use a volume filter driver (not shown) to monitor all backup volumes (e.g., 140, 145, etc. of storage medium 120) at backup server 110. This can be helpful to ensure that no other processes other than replica agent 130 can write to the backup volume (i.e., shadow copy storage space 145) or at least make sure that even if other processes/applications are writing to the backup volume, the same checks are made to ensure that the valid shadow copies are retained, which can provide various security benefits. In one implementation, for example, the volume filter driver can store a variable that is initialized with the amount of available shadow copy storage space (e.g., 147). Each time replica agent 130 writes data to the main data backup volume (e.g., 140), the volume filter driver can assume that this write will result in deleted data being moved to the corresponding shadow copy volume (e.g., 145). In such a case, the volume filter may be configured to assume the extreme scenario wherein each write is a change to existing data, and requires not just the new write but also a copy of the overwritten data to be passed to the shadow copy storage space.

As such, the volume filter driver can be configured to decrement 1 block from the free available shadow copy storage space for each identified write to the main data backup. The volume filter driver can also routinely synchronize its determinations of available free shadow copy storage space (as described more fully hereinafter). Ultimately, when the available shadow copy data space allotment is decremented to 0, replica agent 130 (which receives its data in this case from the volume filter driver) will be unable to make any writes to storage medium 120, and thus no writes to the shadow copy storage space (e.g., 145). In turn, replica agent 130 can raise an alert to the backup administrator, requesting any one or more of the various accommodating actions previously described.

In light of the various size approximations described herein, a backup administrator may need to resolve incidences in which block sizes differ in the production server 105 file system compared with the same blocks in the backup storage medium 120. In particular, a block change computed prior to a replication cycle or validation/error correction may not necessarily translate to the same size of block change on the available shadow copy space. Of course, if the file system block at production server 105 size is larger than or equal to the block size administered at storage medium 120, there may not be any issues since the available free space at storage medium 120 will be effectively underestimated. On the other hand, if the block size at production server 105 is less than the block size at storage medium 120, then the available free space at storage medium 120 will be effectively overestimated, which could result in premature shadow copy overwrites/deletions. In such a case replica agent 130 can perform a number of additional steps to underestimate the amount of available free space.

For example, replica agent 130 can set the production server 105 block size and backup storage medium 120 block size to be the same. This can involve the replica agent 130 normalizing the size of changes determined earlier, so that a block match between production server 105 and storage medium 120 is effectively one-to-one. Alternatively, replica agent 130 can adjust the determination of total blocks due to changes at production server 105, and add one or more blocks, and thereby overestimate the number of changes received from production server 105. In this regard, replica agent 130 can be configured to assume that changed blocks are contiguous, and, as such, add one block to the computed changed blocks at production server 105 that need to be written to storage medium 120.

Alternatively, replica agent 130 can be configured to walk through the logical offsets of each of the changed blocks at production server 105. In such a case, replica agent might add 1 block value to each set of contiguous blocks that have changed (or are new), and also count 1 standalone block that has changed as 2 blocks. In still another alternative implementation, the replica agent 130 could walk through the logical offsets of the changed file blocks at production server 105, and compare these boundaries with block boundaries used at storage medium 120, such as used by a volume shadow copy service. The backup server 110 can use this comparison to determine the precise number of changed blocks (as they are defined at storage medium 120) from production server 105 that will need to be applied to the shadow copy storage space (e.g., 145).

Also in light of the various approximations described herein, replica agent 130 may further need to periodically synchronize its approximations of the available shadow copy storage space with the actual available shadow copy storage space. This can help prevent compounding approximation errors over time. In one implementation, for example, replica agent 130 can determine the available free shadow copy storage space (e.g., 147) upon identifying that there is sufficient space to apply a particular change at production server 105, but before applying such a change. Replica agent 130 might then label this as "pre space." Upon applying changes from production server 105, replica agent 130 can then query (i.e., querying a volume shadow copy service) the remaining, available shadow copy storage space e.g., 147 after changes), and label this as "post space."

Assuming no shadow copies have been reclaimed in between, the "actual changes" applied to the shadow copy storage are represented by the difference between the "pre space" and the "post space." Replica agent 130 can then compute the deleted blocks by subtracting the modified blocks (as opposed to new blocks) from the "actual changes," based on the assumption that modified blocks comprise deleted blocks that have been overwritten, as previously described. This can result in a value of "adjusted deleted blocks." Replica agent 130 can then use the "adjusted deleted blocks" in the previously described processes when computing the size of changes.

Figure 2:
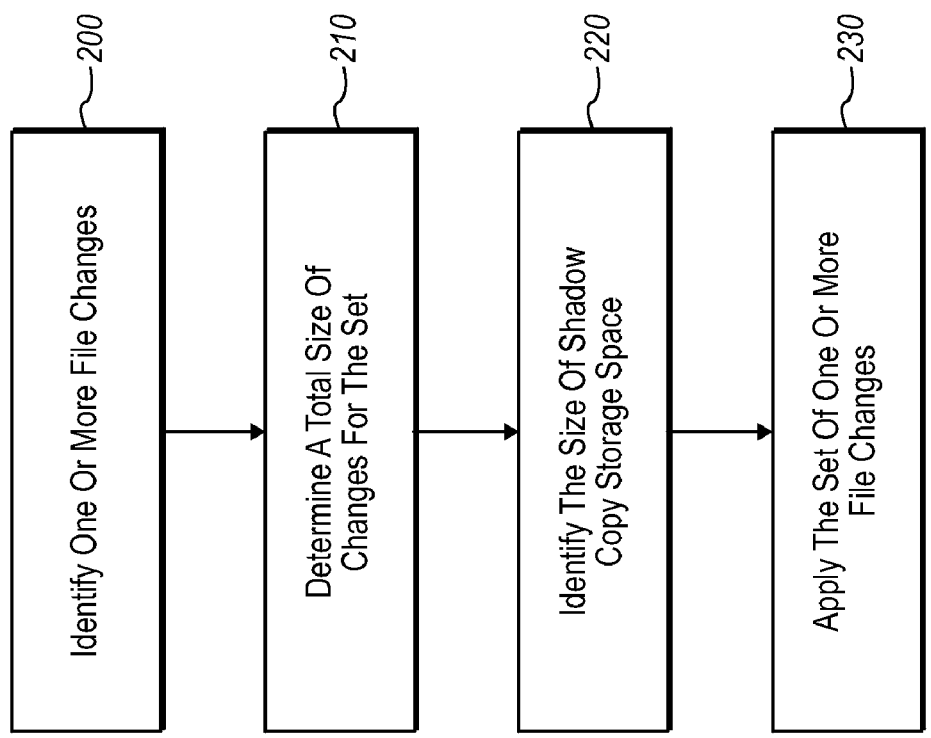
FIG. 2 illustrates a flowchart of a sequence of acts in a method of applying changes from a production server to a backup server by identifying the total size of changes coming from the production server.
Figure 3:
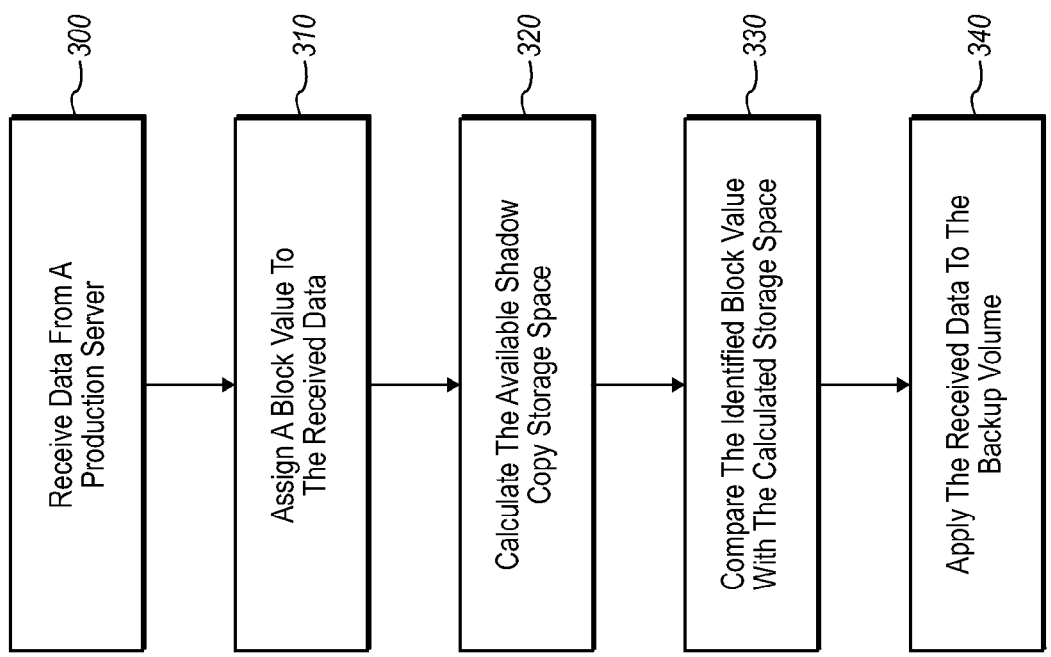
FIG. 3 illustrates a flowchart of a sequence of acts in a method of applying changes from a production server to a backup server by identifying the total size of available free space before applying changes received from the production server.

Accordingly, the foregoing text describes a number of components and modules that can ensure that valid copies of backup updates (i.e., shadow copies) can survive their intended time. In particular, such implementations can be applied to make current backup systems much more robust, reliable, and efficient, without unduly burdening technical personnel, such as backup administrators. Implementations of the present invention can also be described in terms of flowcharts of methods comprising a series of one or more acts or steps for accomplishing intended results. For example, FIG. 2 illustrates a flowchart of a method of identifying the total size of changes at a production server that are to be applied at a backup server, while FIG. 3 illustrates a flowchart of a method for identifying available storage space in the backup server prior to applying changes. FIGS. 2 and 3 are discussed below with reference to the components illustrated in FIG. 1.

In particular, FIG. 2 shows that a method in accordance with an implementation of the present invention of correlating determinations of file changes at a production server with available shadow copy storage space in one or more backup volumes comprises an act 200 of identifying one or more file changes. Act 200 includes identifying a set of one or more data changes at a production server. For example, replica agent 130 receives data updates 123 and/or 127 from production server 105, via log file 113.

In addition, FIG. 2 shows that the method can comprise a step 210 for determining a total size of changes for the set. Step 210 includes determining a total size of changes in the set that are to be applied to a shadow copy storage volume, such that the total size of changes are overestimated. For example, upon receiving changes via log file 113, replica agent 130 determines a value that approximates the size of changes that will ultimately need to be applied to backup volume 145.

Generally, although step 210 can include any number or order of corresponding acts, step 210 comprises in at least one implementation, the acts of assigning a standard value to each data portion in each new file of the set, assigning the standard value to each data portion that is appended to any file in the set, and assigning the standard value to each file that has been overwritten. For example, replica agent 130 assigns one byte block value (or other data size equivalent) when identifying blocks that are new (e.g., new files, file appends), blocks that have been modified, or when identifying files (or blocks) that have been overwritten. Step 210 can also comprise the acts of assigning the standard value to each metadata portion that has been changed in any file of the set, and adding each assigned standard value, such that the total size of changes at the production server is approximated. For example, replica agent 130 can add a block for each metadata change (or one block for changes that cancel out), and then add all block assignments to approximate the total size of blocks that will need to be applied to the backup volume (e.g., 145).

In addition, FIG. 2 shows that the method can comprise an act 220 of identifying the size of shadow copy storage space. Act 220 includes identifying a size of available shadow copy storage space in the shadow copy storage volume. For example, replica agent 130 queries a volume shadow copy service to identify how much space is both allocated and free in a generalized backup volume (e.g., 140), or how much space is free (e.g., 147) in a shadow copy storage volume (e.g., 145).

Furthermore, FIG. 2 shows that the method can comprise a step 230 of applying the set of one or more file changes. Step 230 includes applying the set of one or more data changes to the identified available shadow copy storage space such that valid shadow copies remain in the shadow copy storage volume prior to expiration. For example, upon identifying the total size of changes from production server 105, and upon identifying how much space is free in the appropriate backup volume, replica agent 130 can pass the received changes to the backup volume.

Generally, although step 230 can comprise any number or order of corresponding acts, step 230 comprises in at least one implementation the acts of identifying an amount of free space in the available shadow copy space, and comparing the total size of changes to the identified free space. Step 230 can also comprise the acts of identifying that the amount of free space is at least as large as the total size of changes, and automatically applying the set of one or more data changes to the identified free space. For example, if replica agent 130 identifies that the available free space (e.g., 147) is at least as large as the total size of changes received from production server 105, replica agent 130 (e.g., via a volume shadow copy service) can simply pass those received changes to the shadow copy storage space. Of course, and as previously described herein, if the available shadow copy storage space is insufficient in size, replica agent 130 can either delete expired shadow copies, or raise an alert to the backup administrator for further action.

FIG. 3 illustrates a similar method as in FIG. 2, however geared more toward simply receiving updates and expending resources determining how much space is available in the shadow copy storage area. In particular, FIG. 2 shows that a method of determining available shadow copy storage space in the one or more backup volumes to thereby apply data updates received from a production server without deleting valid shadow copy data can comprise an act 300 of receiving data from a production server. Act 300 includes receiving one or more data changes from a production server. For example, replica agent 130 receives a set of one or more data changes from production server 105 (regarding data 125) via log file 113.

FIG. 3 also shows that the method can comprise an act 310 of assigning a block value to the received data. Act 310 includes assigning a standard value to each of the one or more data changes in an initial set. For example, and as previously described herein, replica agent 130 can be configured to pass a single file, or a single block, at a time into the corresponding shadow copy storage space (e.g., 145) as it continually determines how much free space is available. At the outset, therefore, replica agent might take an initial file in a set of one or more data updates, and determine how many block values to assign to the file (e.g., one block for an append, one block for a changed/modified pre-existing block, etc.).

In addition, FIG. 3 shows that the method can comprise a step 320 of calculating the available shadow copy storage space. Step 320 includes calculating an amount of available shadow copy storage space in a backup volume, such that the amount is underestimated in order to preserve valid shadow copies stored in the backup volume. For example, replica agent 130 can routinely query a volume shadow copy service each time replica agent 130 begins to pass a "file" (as understood herein) to the shadow copy storage space for how much space is free. That is, though replica agent 130 will generally pass data directly to the main data backup and use a volume shadow copy service (not shown) to pass shadow copy data to the shadow copy storage space, replica agent 130 can query the volume shadow copy service for available free space. Replica agent 130 can also simply query the volume shadow copy service for the available free space every several sets of files received from production server 105, and then consider a certain portion of the free space as safe.

Although step 320 can include any number or order of corresponding acts for accomplishing the step, step 320 comprises in at least one implementation, the acts of identifying a first byte block of the one or more data changes, requesting from a volume shadow copy service an amount of the available shadow copy storage space that is free, identifying a second byte block of the one or more data changes, and requesting again from the volume shadow copy service an amount of the available shadow copy storage space that is free. Alternatively, step 320 can include the acts of identifying an amount of the available shadow copy storage space that is free, setting a reduced portion of the identified free space as safe, and summing the standard values corresponding to a first plurality of data changes in the set to determine a total size of changes for the first plurality.

FIG. 3 further shows that the method can comprise an act 330 of comparing the identified block value with the calculated storage space. Act 330 includes identifying that the standard value of the initial set of the one or more data changes is less than the calculated amount of the available shadow copy storage space in the backup volume. For example, replica agent 130 determines that the total size of changes for the initial file or sets of files (e.g., a subset of all changes received from production server 105) is less than either an instant query result for available free space, or less than what it previously deemed as fitting in a safe amount of the shadow copy storage space.

Furthermore, FIG. 3 also shows that the method comprises an act 340 of applying the received data to the backup volume. Act 340 includes applying the initial set of the one or more data changes to the backup volume, such that valid shadow copies remain in the shadow copy storage volume prior to expiration. For example, if appropriately fitting within the identified free space or safe amount of free space, replica agent 130 can simply pass the initial file (or sets of files) received from production server to the free space in the backup volume (e.g., 147). Alternatively, if doing so will cause deletion of preexisting but valid shadow copies from the backup volume, replica agent 130 can raise an alert, or take other automatic actions to accommodate for this, as previously described.

Accordingly, implementations of the present invention provide a number of components, schematics, and methods for ensuring that shadow copies can be retained throughout their valid period without danger of the shadow copies being deleted prematurely. In particular, implementations of the present invention provide a variety of mechanisms that allow these issues to be treated from a variety of alternative perspectives (i.e., total size of changes, continual monitoring of shadow copy storage space, and useful estimations of shadow copy storage space). Furthermore, implementations of the present invention provide a number of mechanisms for ensuring the consistency of data size measurements between two servers, and for mitigating approximation errors that could multiple over time through various synchronization processes. As such, implementations of the present invention provide much more efficient and reliable shadow copy backup mechanisms than conventionally available.

The embodiments of the present invention may comprise a special purpose or general-purpose computer including various computer hardware, as discussed in greater detail below. In particular, embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computerized system in which a backup server applies data backups and corresponding updates to one or more backup volumes, a method of correlating determinations of data changes at a production server with available shadow copy storage space in the one or more backup volumes, comprising:
    an act of identifying a set of one or more data changes at a production server;
    a step for determining a total size of changes in the set that are to be applied to a shadow copy storage volume, such that the total size of changes are one of accurately determined or overestimated;
    an act of identifying a size of available shadow copy storage space in the shadow copy storage volume; and
    a step for applying the set of one or more data changes to the identified available shadow copy storage space such that valid shadow copies remain in the shadow copy storage volume prior to expiration.

2. The method as recited in claim 1, wherein the act of identifying a size of available shadow copy storage space in the shadow copy storage volume comprises an act of requesting the size of available shadow copy storage space from a volume shadow copy service.

3. The method as recited in claim 1, wherein the step for determining a total size of changes in the set that are to be applied to a shadow copy storage volume comprises the acts of:
    assigning a standard value to each data portion in each new file of the set, and to each data portion that is appended to any file in the set;
    assigning the standard value to each file that has been overwritten
    assigning the standard value to each metadata portion that has been changed in any file of the set; and
    adding each assigned standard value, such that the total size of changes at the production server is one of exactly determined or overestimated.

4. The method as recited in claim 3, wherein the data portion is a byte block, such that the standard value is assigned to each byte block that has changed in the set of one or more data changes.

5. The method as recited in claim 1, wherein the step for applying the set of one or more data changes to the identified available shadow copy storage space comprises the acts of:
    identifying an amount of free space in the available shadow copy space; and
    comparing the total size of changes to the identified free space.

6. The method as recited in claim 5, further comprising the acts of:
    identifying that the amount of free space is at least as large as the total size of changes; and
    automatically applying the set of one or more data changes to the identified free space.

7. The method as recited in claim 5, further comprising an act of identifying that the amount of free space is insufficient to accommodate the total size of changes.

8. The method as recited in claim 7, further comprising the acts of:
    automatically deleting one or more shadow copies that have expired; and
    automatically applying the set of one or more data changes to the identified free space.

9. The method as recited in claim 7, further comprising an act of raising an alert for further action, wherein the alert comprises at least one of:
    (i) a recommendation of one or more shadow copies that can be deleted; and
    (ii) a recommendation to increase the size of the available shadow copy storage space.

10. The method as recited in claim 1, wherein the backup server further comprises a volume filter driver configured to monitor the one or more backup volumes at the backup server; and wherein the volume filter driver is the only process allowed to write to any of the one or more backup volumes.

11. The method as recited in claim 10, wherein the volume filter driver is configured to perform the acts of:
    assigning a first value to an identified amount of available shadow copy storage space;
    determining the total size of changes in the set at least in part by assuming that each of the one or more data changes includes an overwrite of prior data;
    decrementing the total size of changes from the first value; and
    upon decrementing the first value to zero, halting any writes to the shadow copy storage volume.

12. In a computerized system in which a backup server applies data backups and corresponding updates to one or more backup volumes, a method of determining available shadow copy storage space in the one or more backup volumes to thereby apply data updates received from a production server without deleting valid shadow copy data, comprising:
    an act of receiving one or more data changes from a production server;
    an act of assigning a standard value to each of the one or more data changes in an initial set;
    a step for calculating an amount of available shadow copy storage space in a backup volume, such that the amount is underestimated in order to preserve valid shadow copies stored in the backup volume;

an act of identifying that a standard value for each of the one or more data changes is less than the calculated amount of the available shadow copy storage space in the backup volume; and an act of applying each of the one or more data changes to the backup volume, such that valid shadow copies remain in the shadow copy storage volume prior to expiration.

13. The method as recited in claim 12, further comprising an act of adjusting byte block sizes reported by the production server to at least approximate byte block sizes reported by a volume shadow copy service.

14. The method as recited in claim 12, wherein each of the one or more data changes corresponds to a byte block that has been added, changed, or overwritten.

15. The method as recited in claim 12, wherein the step for calculating an amount of available shadow copy storage space in a backup volume comprises the acts of:

identifying a first byte block of the one or more data changes;

requesting from a volume shadow copy service an amount of the available shadow copy storage space that is free;

identifying a second byte block of the one or more data changes; and requesting again from the volume shadow copy service an amount of the available shadow copy storage space that is free.

16. The method as recited in claim 12, wherein the step for calculating an amount of available shadow copy storage space in a backup volume comprises the acts of:

identifying an amount of the available shadow copy storage space that is free;

setting a reduced portion of the identified free space as safe; and receiving input that modifies the set amount of the free space identified as safe to a different amount of the free space.

17. The method as recited in claim 16, further comprising the acts of:

summing the standard values corresponding to a first plurality of data changes in the set to determine a total size of changes for the first plurality; and comparing the total size of changes for the first plurality with the identified safe space.

18. The method as recited in claim 16, further comprising the acts of:

deducting the identified safe space at least by the amount of the first plurality of data changes;

summing the standard values corresponding to a second plurality of data changes to determine a total size of changes for the second plurality; and comparing the total size of changes for the second plurality with the deducted safe space.

19. The method as recited in claim 16, further comprising a step for adjusting for any approximation errors in the identified available shadow copy storage space, the step comprising the acts of:

calculating a difference in the shadow copy storage space after applying the first and second plurality of data changes to determine actual changes in the backup volume; and reducing the actual changes by a number of blocks that have been overwritten to determine an actual value of deleted blocks.

20. In a computerized system in which a backup server applies data backups and corresponding updates to one or more backup volumes, a computer program product having computer-executable code stored thereon that, when executed, cause one or more processors in the backup server to perform a method comprising the following:

an act of identifying a set of one or more data changes at a production server;

a step for determining a total size of changes in the set that are to be applied to a shadow copy storage volume, such that the total size of changes are one of accurately determined or overestimated;

an act of identifying a size of available shadow copy storage space in the shadow copy storage volume; and a step for applying the set of one or more data changes to the identified available shadow copy storage space such that valid shadow copies remain in the shadow copy storage volume prior to expiration.

* * * * *